United States Patent
Kofman et al.

(10) Patent No.: US 10,810,363 B2
(45) Date of Patent: Oct. 20, 2020

(54) IMAGE ANNOTATIONS IN COLLABORATIVE CONTENT ITEMS

(71) Applicant: Dropbox, Inc., San Francisco, CA (US)

(72) Inventors: Igor Kofman, San Francisco, CA (US); Lars Johnson, San Francisco, CA (US); Kevin Tunc, San Francisco, CA (US); David C. Stinnette, San Francisco, CA (US); Travis Hance, San Francisco, CA (US); Neil Sethi, San Francisco, CA (US); Sheila Ramaswamy, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 92 days.

(21) Appl. No.: 16/223,874

(22) Filed: Dec. 18, 2018

(65) Prior Publication Data
US 2019/0121845 A1 Apr. 25, 2019

Related U.S. Application Data

(63) Continuation of application No. 15/464,162, filed on Mar. 20, 2017, now Pat. No. 10,198,413.

(Continued)

(51) Int. Cl.
*G06F 40/169* (2020.01)
*G06F 3/0482* (2013.01)
*G06T 3/40* (2006.01)

(52) U.S. Cl.
CPC .......... *G06F 40/169* (2020.01); *G06F 3/0482* (2013.01); *G06T 3/40* (2013.01); *G06T 2200/24* (2013.01); *G06T 2219/004* (2013.01)

(58) Field of Classification Search
CPC .... G06F 17/241; G06F 3/0482; G06F 40/169; G06T 3/40; G06T 2200/24; G06T 2219/004

(Continued)

(56) References Cited

U.S. PATENT DOCUMENTS 6,456,305 B1 9/2002 Qureshi et al.
6,978,418 B1 12/2005 Bain et al.

(Continued)

FOREIGN PATENT DOCUMENTS

EP 1610230 12/2005

OTHER PUBLICATIONS

European Patent Office, Communication pursuant to Article 94(3) EPC, EP Patent Application No. 17818283.8, dated Jan. 9, 2020, 11 pages.

(Continued)

*Primary Examiner* — Andrew R Dyer
(74) *Attorney, Agent, or Firm* — Fenwick & West LLP

(57) ABSTRACT

A collaborative content management system enables users to selectively create threads and comments linked to specific portions of an image. An image comment may be indicated by a tag displayed at the location based on the specific portion of the image and having an identifier of the thread. Tags for image comments may be clustered together. When an image having image comments is replaced by a replacement image, the tags from the image may be transferred from the image to the replacement image and displayed at the same relative positions in the replacement image as positioned in the original image.

17 Claims, 12 Drawing Sheets

Related U.S. Application Data

(60) Provisional application No. 62/440,970, filed on Dec. 30, 2016.

(58) Field of Classification Search
USPC .................................. 715/230, 232, 243
See application file for complete search history.

(56) References Cited

U.S. PATENT DOCUMENTS

| | | | |
|---|---|---|---|
| 7,945,653 B2 | 5/2011 | Zuckerberg et al. | |
| 8,803,901 B1 | 8/2014 | Cornell et al. | |
| 9,235,906 B2 | 1/2016 | Carbonneau et al. | |
| 9,317,738 B2 | 4/2016 | Srinivasan et al. | |
| 9,367,568 B2 | 6/2016 | Stoop et al. | |
| 9,437,038 B1* | 9/2016 | Costello | G06T 15/08 |
| 9,621,505 B1 | 4/2017 | Ko et al. | |
| 9,792,876 B2 | 10/2017 | Xie et al. | |
| 9,898,701 B2 | 2/2018 | Welinder et al. | |
| 2003/0020956 A1* | 1/2003 | Goel | G06K 15/02 358/1.18 |
| 2006/0242590 A1* | 10/2006 | Polivy | G06F 16/9577 715/760 |
| 2009/0100462 A1* | 4/2009 | Park | H04N 21/4621 725/38 |
| 2009/0141315 A1* | 6/2009 | Hachiro | G06F 3/0482 358/471 |
| 2011/0161792 A1* | 6/2011 | Florence | G06F 16/9558 715/205 |
| 2012/0026324 A1* | 2/2012 | Kiyoshige | G01S 5/0263 348/142 |
| 2012/0124052 A1 | 5/2012 | Furey et al. | |
| 2012/0169769 A1 | 7/2012 | Minamino et al. | |
| 2012/0206469 A1 | 8/2012 | Hulubei et al. | |
| 2013/0147845 A1 | 6/2013 | Xie et al. | |
| 2013/0155181 A1* | 6/2013 | Williams | H04N 13/349 348/36 |
| 2013/0346409 A1 | 12/2013 | Welinder et al. | |
| 2013/0346847 A1 | 12/2013 | Zhang et al. | |
| 2014/0002495 A1* | 1/2014 | Lamb | G06F 3/1431 345/633 |
| 2014/0026088 A1* | 1/2014 | Monte | G01C 21/3682 715/765 |
| 2014/0044358 A1 | 2/2014 | Srinivasan et al. | |
| 2014/0050419 A1* | 2/2014 | Lerios | G06T 3/0056 382/276 |
| 2014/0067932 A1 | 3/2014 | Srinivasan et al. | |
| 2014/0096020 A1 | 4/2014 | Grosz et al. | |
| 2014/0164968 A1* | 6/2014 | Aalami | G06F 19/321 715/771 |
| 2014/0189539 A1* | 7/2014 | St. Clair | G06F 3/048 715/753 |
| 2014/0244165 A1* | 8/2014 | Bells | G01C 21/367 701/455 |
| 2014/0289323 A1* | 9/2014 | Kutaragi | G06Q 50/01 709/203 |
| 2015/0113395 A1* | 4/2015 | Kim | G06F 3/0482 715/273 |
| 2015/0262428 A1 | 9/2015 | Tatzgern et al. | |
| 2015/0286624 A1* | 10/2015 | Simons | G06F 17/2247 715/230 |
| 2016/0275312 A1 | 9/2016 | Stoop et al. | |
| 2016/0307294 A1 | 10/2016 | McPhail | |
| 2018/0063260 A1* | 3/2018 | Pei | H04W 4/42 |
| 2018/0115877 A1* | 4/2018 | Riker | H04W 4/50 |

OTHER PUBLICATIONS

PCT International Search Report and Written Opinion, PCT Application No. PCT/162017/057470, dated Feb. 21, 2018, 11 pages.

United States Office Action, U.S. Appl. No. 15/464,162, dated Apr. 13, 2018, 22 pages.

IP Australia, Examination Report No. 3, AU Patent Application No. 2017386055, dated Dec. 16, 2019, five pages.

IP Australia, Examination Report No. 2, AU Patent Application No. 2017386055, dated Oct. 14, 2019, three pages.

Examination Report No. 4, for Australian Application No. 2017386055, dated Feb. 28, 2020, 4 pages.

Notice of Reasons for Refusal for Japanese Application No. 2019-0508195 dated Feb. 10, 2020, 7 pages.

Decision to Grant a Patent for Japanese Application No. 2019-508195 dated May 18, 2020, 5 pages.

Notice of Acceptance for Australian Application No. 2017386055 dated Jun. 11, 2020, 3 pages.

\* cited by examiner

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

New Comment...

Comments (6)

Edward Everett  12/15/10 at 11:05 pm
You say in two minutes what would take me two hours. Well done.

Bill Seward  12/15/10 at 11:10 pm
Certainly the bloodiest...
2 more comments

John Hay  12/15/10 at 11:1pm
What happened to "It is altogether fitting and proper that we should do this." ???

Reply

George Bancroft  12/15/10 at 11:05 pm
I would like to use this in fundraising for soliders.
@Bill_Seward your thoughts?

Reply

*FIG. 6A*

Gettysburg Address Wardrobe

New Comment... — 632

① Edward Everett — at 3:05 pm — 634
Appropriate to forgo the hat for this somber address — 633a Bill Seward — at 9:23 pm — 635
But taking the hat off may add gravity to moments before the address ② George Bancroft — at 11:05 pm — 640
Excellent choice Mr. President. This is what the nation needs to see. — 633b Reply John Hay — at 11:18pm — 642
Are you sure about this tie?

Reply — 644

- Four in hand Necktie
- This occasion calls for a frock coat

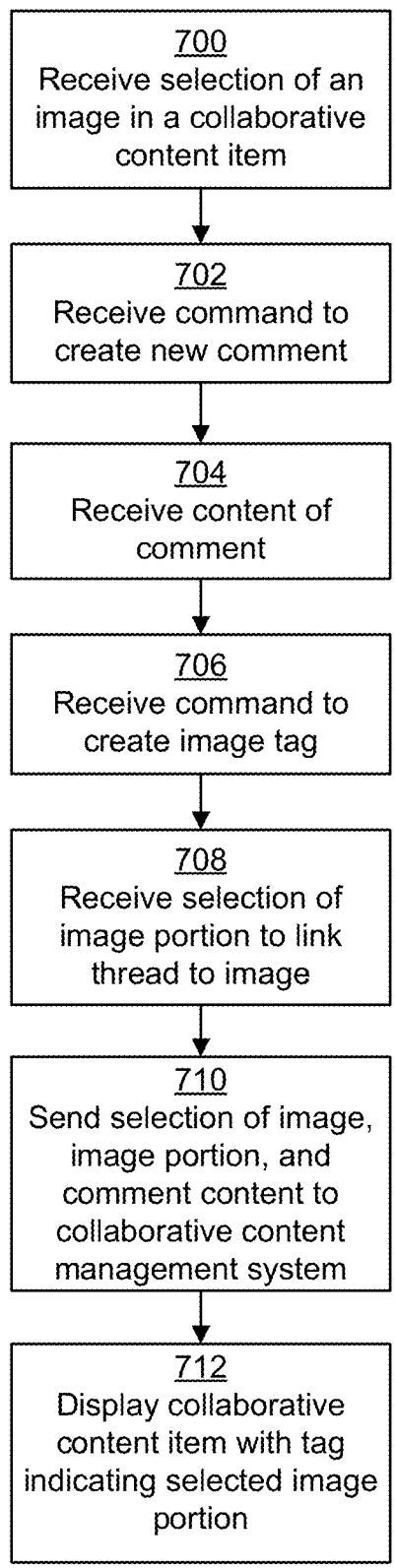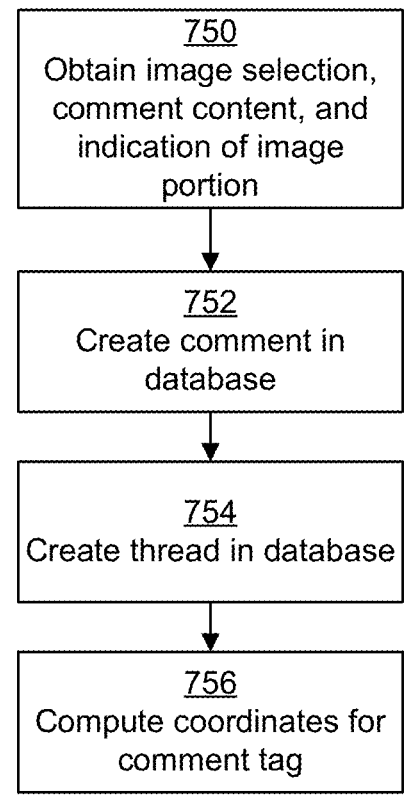
FIG. 7A
FIG. 7B

IMAGE ANNOTATIONS IN COLLABORATIVE CONTENT ITEMS

CROSS REFERENCE TO RELATED APPLICATIONS

This application is a continuation of U.S. application Ser. No. 15/464,162, filed Mar. 20, 2017, now U.S. Pat. No. 10,198,413, which claims the benefit of U.S. Provisional Application No. 62/440,970, filed Dec. 30, 2016, all of which is incorporated by reference in their entirety.

TECHNICAL FIELD

The disclosed embodiments generally relate to managing image annotations in shared collaborative content items.

BACKGROUND

Online collaborative sharing of documents is typically provided by a network-based file sharing computer system that allows multiple users to access and edit the files. Generally, documents are created and edited by a specific type of native application, such as a word processor or spreadsheet application. Many such applications provide support for tracking comments or other forms of annotation made to portions of a file, such as comments on words, sentences or paragraphs in a document, or cells in a spreadsheet. However, existing systems do not provide native programmatic functions that enable users to create comments or annotations that are linked to a specific portion of an image rather than an entire image. Instead, existing systems only provide for comments linked to the entire image, leaving users to then attempt to describe the specific portion that they are referring to in the comment. This approach fails to provide sufficient granularity and control for comments on images.

SUMMARY

A collaborative content management system allows users to create, edit and share collaborative content items among a plurality of other users. A collaborative content item can include various types of content such as text, images or other multi-media, tables, etc. Users can communicate with the collaborative content management system using a client application on a client device or through a web application. The client application provides an interface for users to access collaborative content items on the collaborative content management system, edit such collaborative content items, comment on collaborative content items, and share collaborative content items with other users.

A collaborative content management system enables creating threads containing comments that are associated with a specific portion of an image. A user can create a comment thread associated with a specific portion of the image by selecting a portion of the image. A tag can be displayed on the image at the specific portion to indicate that the thread is linked to the specific portion. Information defining the coordinates of the portion are stored in association with the thread containing the comment. Other users may reply to the thread with further comments, thereby associating the further comments with the specified portion of the image. The specific portion may be a specific location, or an area of the image.

The information defining the coordinates of the specific portion may be defined in terms of relative positions in the image, taking account of image size or image resolution. This allows the thread to be applied or transferred from the image to a second replacement image, while maintaining the relative location within the replacement image that the thread is associated with, and further allowing for correct positioning of the tag representing the linked thread.

The present invention has embodiments in a client device and client application, a collaborative content management system, computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6A shows an example user interface with a page of a collaborative content item including various comments.

FIGS. 6B-6E show various interfaces for creating and displaying image comments.

FIG. 7A shows one embodiment of a client side algorithm for creating an image comment thread.

FIG. 7B shows one embodiment of a server side algorithm for creating an image comment thread.

DETAILED DESCRIPTION

System Overview

Figure 1:
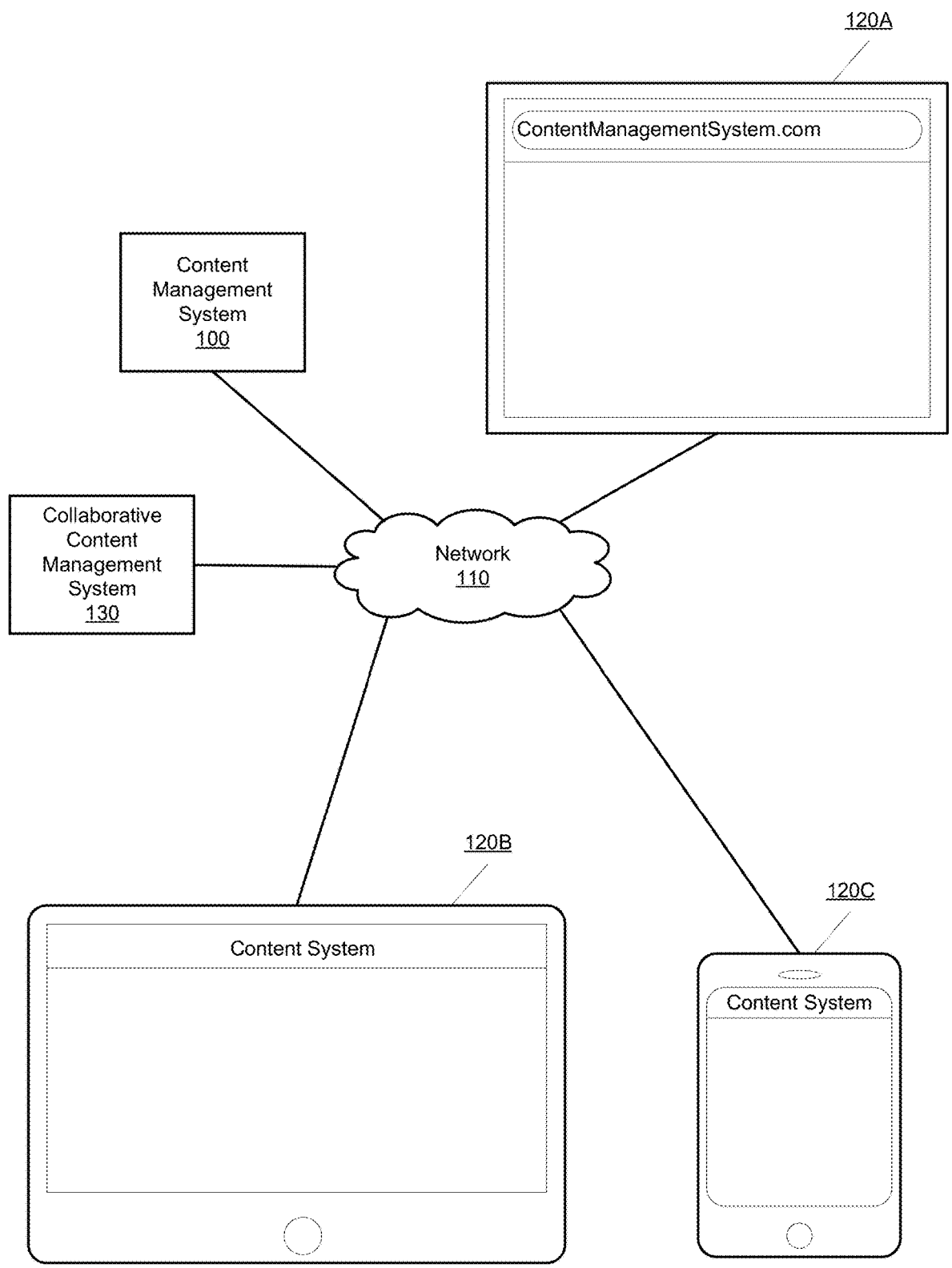
FIG. 1 shows a diagram of a system environment of a content management system and a collaborative content management system according to one embodiment.

FIG. 1 shows a system environment including content management system 100, collaborative content management system 130, and client devices 120A, 120B, 120C (collectively or individually "120"). Content management system 100 provides functionality for sharing content items with one or more client devices 120 and synchronizing content items between content management system 100 and one or more client devices 120

The content stored by content management system 100 can include any type of content items, such as documents, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative content item editor provided by collaborative content management system 130. In various implementations, collaborative content items can be stored by collaborative content item management system 130, with content management system 100, or external to content management system 100. A collaborative content item editor can be a platform whereby users can simultaneously create and edit collaborative content items, comment in the collaborative content items, and manage tasks within the collaborative content items.

Users may create accounts at content management system 100 and store content thereon by sending such content from client device 120 to content management system 100. The content provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
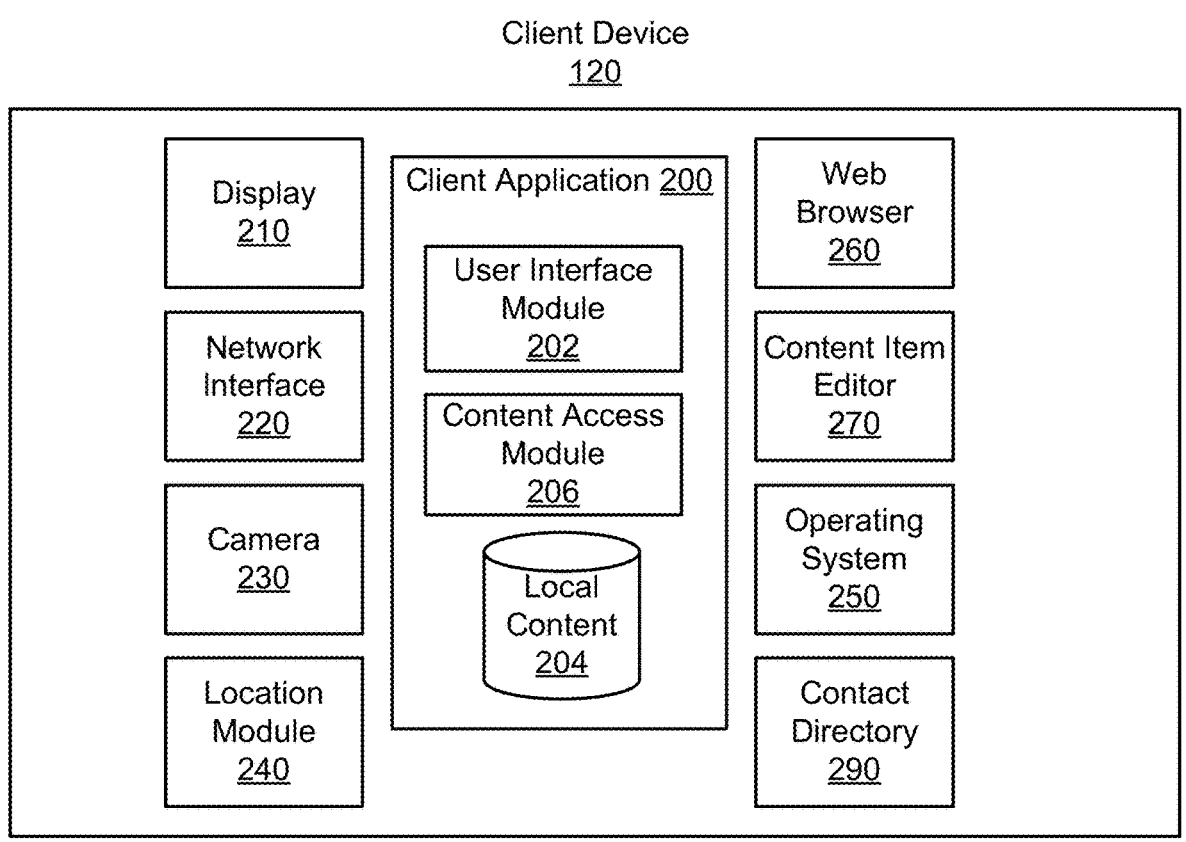
FIG. 2 shows a block diagram of the components of a client device.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and, in certain client devices 120, includes a touchscreen. Client device 120 also includes network interface 220 for communicating with content management system 100 via network 110. Other components of a client device 120 that are not material are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules include operating system 250 and optionally a content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and content item editor 270. A contact directory 290 stores information on the user's contacts, such as name, telephone numbers, company, email addresses, physical address, website URLs, and the like.

Client devices 120 can access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system 100 is represented as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
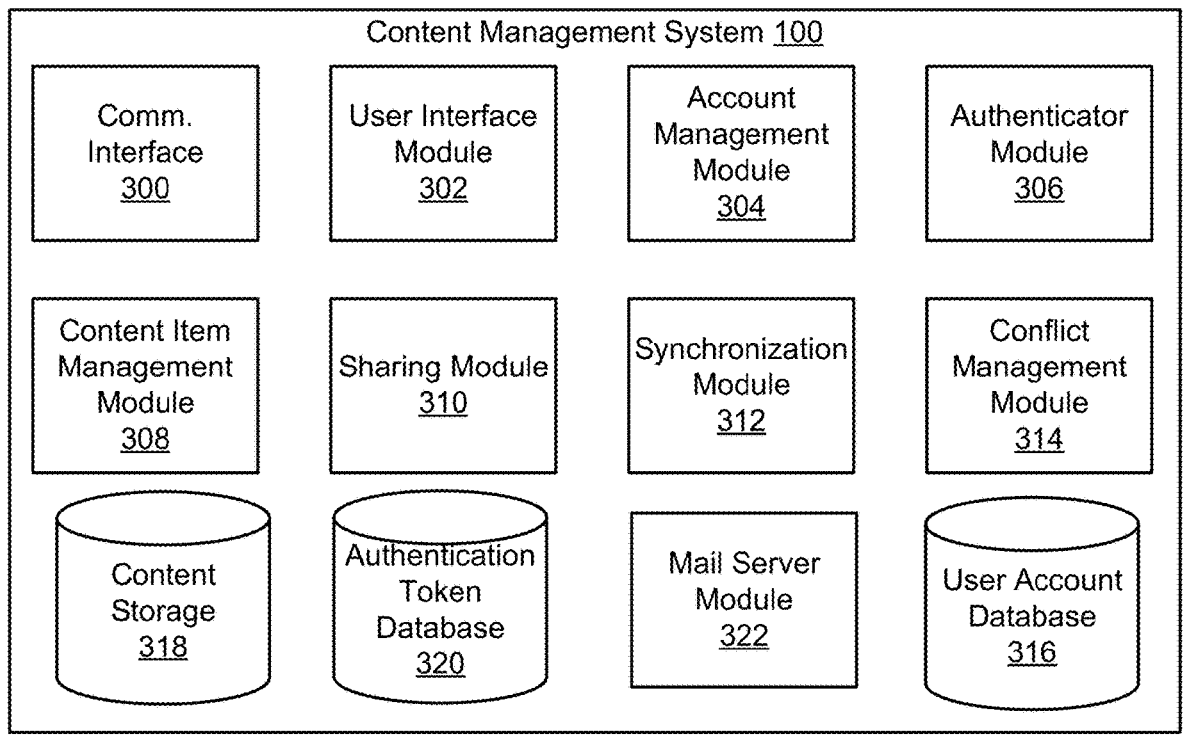
FIG. 3 shows a block diagram of the content management system.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as content items or other data being "associated" with a user are understood to mean an association between a content item and either of the above forms of user identifier for the user. Similarly, data processing operations on content items and users are understood to be operations performed on corresponding identifiers such as contentItemIDs and userIDs. For example, a user may be associated with a content item by storing the information linking the userID and the contentItemID in a table, file, or other storage formats. For example, a database table organized by contentItemIDs can include a column listing the userID of each user associated with the content item. As another example, for each userID, a file can list a set of contentItemID associated with the user. As another example, a single file can list key values pairs such as <userID, contentItemID> representing the association between an individual user and a content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier (e.g., a contentItemID).

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and at a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaborative Content Management System

Figure 4:
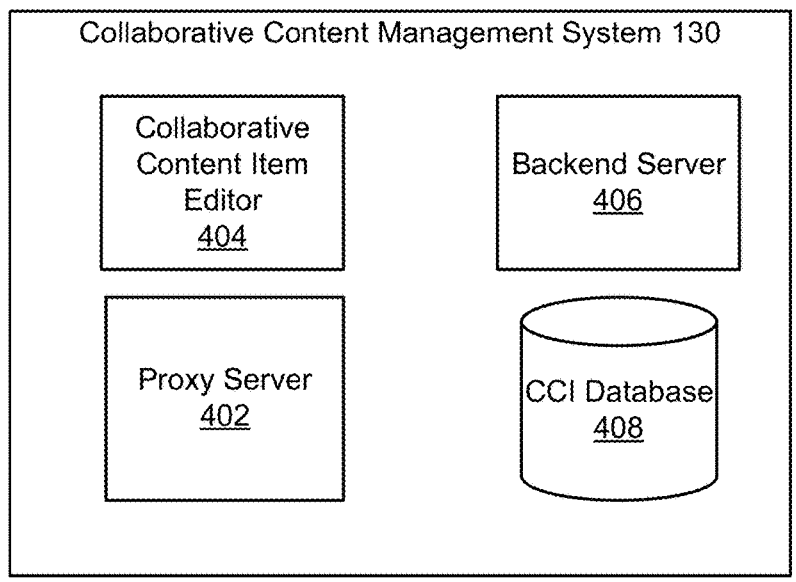
FIG. 4 shows a block diagram of the collaborative content management system.

FIG. 4 shows a block diagram of the collaborative content management system 130, according to one embodiment. Collaborative content items can be files that users can create and edit using a collaborative content item editor 404 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaboration services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and notification server 410. Proxy server 402 handles requests from client applications 200 and passes those requests to the collaborative content item editor 404.

Collaborative content item editor 404 manages application level requests for client applications 200 for editing and creating collaborative content items, and selectively interacts with backend servers 406 for processing lower level tasks on collaborative content items and interfacing with collaborative content items database 408 as needed. Content items database 408 contains a plurality of database objects representing collaborative content items, comment threads, and comments. Notification server 410 detects actions performed on collaborative content items that trigger notifications, creates notifications in notification database 412, and sends notifications to client devices.

Client application 200 sends a request relating to a collaborative content item to proxy server 402. Generally, a request indicates the userID ("UID") of the user, and the CollaborativeContentItemID of the collaborative content item (discussed in more detail with reference to FIG. 5 below), and additional contextual information as appropriate, such as the text of the collaborative content item. When proxy server 402 receives the request, the proxy server 402 passes the request to the collaborative content item editor 404. Proxy server 402 also returns a reference to the identified collaborative content items server 404 to client application 200, so the client application can directly communicate with the collaborative content item editor 404 for future requests. In an alternative embodiment, client application 200 initially communicates directly with a specific collaborative content item editor 404 assigned to the userID. Thus, processes performed by the collaborative content item editor 404 may be in response to receiving input from the client application 200. In some embodiments, users may interact directly with the collaborative content item editor 404 through a web application on a browser as opposed to through a client application.

When collaborative content item editor 404 receives a request, it determines whether the request can be executed directly or by a backend server 406. When the request adds, edits, or otherwise modifies a collaborative content item, the request is handled by the collaborative content item editor 404. If the request is directed to a database or index inquiry, the request is executed by a backend server 406. For example, a request from client device 120 to view a collaborative content item or obtain a list of collaborative content items responsive to a search term does not modify collaborative content items and is processed by backend server 406.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Database Structures

Figure 5:
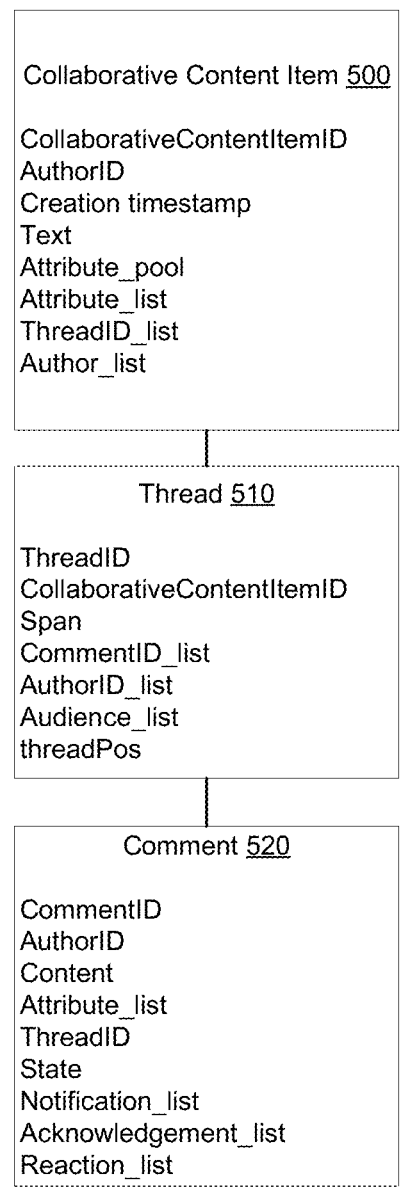
FIG. 5 shows a block diagram of an example data structure for collaborative content items, threads, and comments.

Referring to FIG. 5, collaborative content item database (CCI database) 408 stores the collaborative content items, content level and image comments, and threads as database entities, and provides programmatic access thereto for searching and retrieving these entities and is one means for performing these functions. The CCI database 408 can be implemented in a relational form using separate tables for collaborative content items, threads, and comments, or using objects, BLOBs, files, or other structures. Additionally, the CCI database 408 may provide a folder hierarchy storage system separate from the content management system 100. In this case, folders would be saved as an additional data structure in the CCI database 408.

Each collaborative content item 500 is composed of a number of elements (equivalently fields, columns, or attributes). In some embodiments, the elements are as follows:

CollaborativeContentItemID: a unique identifier assigned by the collaborative content management system 130 to access the collaborative content item.

AuthorID: the userID of the user who created the collaborative content item, and may include the username of the user. These values may be encrypted for privacy.

Creation timestamp: indicates the date and time that the collaborative content item was created.

Text: The text of the collaborative content item, which can be represented as string of ASCII characters.

Attribute_pool: Formatting attributes (e.g., bold, underline, italics, font, font size, line spacing, paragraphs, and the like) that are used in the collaborative content item. The attribute pool can be a set of attributeIDs used in the collaborative content item; a native set of attributeIDs and associated formats are provided by the collaborative content management system 130. The following table is an example of a portion of an attribute pool:

| Attribute ID | Formatting |
|---|---|
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| ... | ... |

Attribute_list: Formatting attributes applied to portions of the collaborative content item, such as text, according to the attribute list. An attribute list element can be a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaborative content item is coded for attributes. For example, the text "Text with bold, italic, and bold italic formatting." would be attribute coded as {10=0, 4=1, 2=0, 6=2, 6=0, 11=1 2, 12=0}.

In addition to formatting that define the format of text in the collaborative content item 500, the collaborative content item editor 404 may also support attributes that indicate other types of media in the collaborative content item. To support images in the collaborative content item, an image attributeID may be assigned. Whenever the image attributeID is detected, the collaborative content item editor 404 may evaluate the text to which the image attributeID is applied to determine an image to display. For example, a URL address for the image or an imageID of the image may be embedded in the text element of the collaborative content item 500. An imageID may simply be an identification code for an image to determine its location on the content management system 100. This URL or imageID may be generated by the collaborative content item editor 404 and added to the text of the collaborative content item 500 upon receiving an image to add to the collaborative content item 500. The user may add an image to the collaborative content item 500 by copying and pasting, clicking and dragging, or through file system navigation menus initiated by the collaborative content item editor 404.

ThreadID_list: a list of all threads that are associated with a collaborative content item. ThreadIDs in the ThreadID_list may represent threads of content level comments and/or threads of image comments.

Author_list: a sequential list of the users who have contributed to the collaborative content item text, according to the sequence of contributed or edited text portions, using the same coding pattern as an attribute list, i.e., (span=userID) pairs. For example, the author_list {100=199, 50=54, 200=199} indicates that in a text of 350 characters, there is a sequence of three text portions, the user with userID 199 authored the first portion with 100 characters, followed by userID 54 who authored the second portion with 50 characters, followed again by userID 199 who authored the third portion with the remaining 200 characters.

The span coding of the attributes and authors is beneficial because it allows for efficient management of insertions and deletions of content. For example, when text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example, with the userID of each author followed by a list of text portions edited by that user.

Each thread data element 510 is composed of a number of elements. In some embodiments, thread data element 510 can include the following elements:

ThreadID: unique identifier assigned by the collaborative content management system.

CollaborativeContentItemID: the CollaborativeContentItemID of the file that contains the thread.

Span: a delineated portion of the content of the identified collaborative content item to which the thread applies. The delineated portion is defined based on the type of the content. For example, a span in text can be defined by the position of the first character in the span, and the length of the span (in number of characters); a span in a spreadsheet can be defined by a range of cells by column and row numbers. For example, the span (50, 25) indicates a text portion starting at character position 50 within the collaborative content item and running 25 characters in length. As the content in the collaborative content item is edited, the collaborative content management system 130 updates the span element of each thread. For example, if a five-character portion of the text before the span (50, 25) is deleted, then the content management system will modify the span of the thread to (45, 25). It is also possible for users to delete text included in the span. If all of the text included in the span of a thread is deleted, then the span will have a null value and is removed by the collaborative content management system 130.

CommentID_list: a list element of commentIDs of the comment data elements (e.g., comment data elements 604) included in the thread corresponding to thread data element 510.

AuthorID_list: a list of userIDs of the authors of comments in the thread.

Audience_list: The Audience_list element is a list indicating the users to whom the thread and its comments are displayed when accessing the collaborative content item, and/or to whom notifications of changes in the thread are sent. In various implementations, the audience of a thread may comprise one or more of the userIDs of i) the author of the collaborative content item containing the thread; ii) the authors of comments included in the thread; iii) the authors of any text included in the span for the thread; iv) any user mentioned in the span the thread via a user primitive; v) any user mentioned in a comment (e.g., via a user primitive); vi) any user who has opened the collaborative content item; vii) any user who has edited the collaborative content item; or viii) any user who has created an association with the collaborative content item, such as by marking it as a favorite or followed collaborative content item. User primitives are further described below. In some implementations, an audience for the thread may not be defined specifically for the thread, but instead may be identified dynamically as needed based on, e.g. user identifiers associated with the comments or with the collaborative content item. The inclusion of an audience for each thread allows for control of which users are notified of, and have access to specific comments.

threadPos: The threadPos of a thread data element 510 indicates the specific portion or location within an image that the linked image thread is associated with. A linked image thread has a span that includes the URL of an image (that is further modified with an image attributeID) and is further linked to a specific portion or location within the image by the threadPos element of the thread data structure. If a comment thread has a span that does not include an image URL or other link modified by the image attributeID, then threadPos can have a null value, can be excluded from a data object, or can be otherwise unset. If threadPos is not null it is structured as a set of one or more offset values, depending on whether the comment is linked to a position or an area/portion of the image.

An offset indicates the relative position of an image tag on an image where (0, 0) is an origin corner (e.g., upper left corner) of the image and (1, 1) is the opposite corner of the image. When receiving a selection of an image portion from the client device in terms of (x,y) pixel location, the relative position is calculated from the pixel location by dividing the input values (x,y) by the current displayed resolution of the image for the respective axis (X,Y). For example, if the collaborative content management system 130 receives a pixel location of (500, 300) relative to an origin corner of the image, and the currently displayed image resolution is (1000, 1000) the relative position of the selected image location can be determined by performing the following calculations: (500/1000, 300/1000)=(0.5, 0.3). This approach is then used for each selected vertex or point defining the selected portion of the image. These values are then stored in threadPos. In some implementations, the exact pixel location, as originally selected is alternatively or additionally saved in the threadPOS element. Using the relative position of the selected portion in an image allows the image tags to be placed in the same position regardless of image size, and correctly placed when the image size is altered or the image resolution for display is increased or decreased.

As noted, an area tag may be used to tag an image. In these cases, the defining vertices or dimensions of the area may be stored in the threadPos element. If an area tag is a rectangular area the threadPos for the area may be defined as: the coordinates of two opposing corners of the rectangle, the coordinates of one corner of the rectangle and the size of the rectangle, a series of coordinates corresponding to the corners of the rectangle, or any other suitable defining set of dimensions. If the area tag is a polygon, the coordinates may be the vertices of the polygon. If the area is a non-uniform user defined area, the coordinates may be a set of connected points defining the area. Likewise, if the tag is a circle the threadPos may be the coordinates of the center of the circle and the radius or diameter of the circle.

When displaying a tag, the collaborative content management system 130 performs the opposite operation as when saving a tag. For example, the collaborative content management system 130 determines the pixel location of the tag for the image by multiplying the threadPos coordinates corresponding to the tag by the resolution of the image. The result is the pixel location(s) for the tag. The collaborative content management system 130 may then display the graphic corresponding to the tag at the calculated pixel location(s) in the image. Where an image with a linked comment thread is replaced by a replacement image, the relative coordinates for the tag in the replacement image are determined by multiplying the threadPos coordinates by the resolution of the replacement image and using the results as pixel locations for the tag. Continuing the above example, if original image is replaced by replacement image with size (2000, 2000), then the updated pixel location for the tag is calculated as (0.5*2000, 0.3*2000)=(1000, 600); the tag is then displayed at this pixel location in the replacement image.

threadPos can be updated when a new tag is applied to a comment thread, when a tag is removed from a comment thread, or when a tag is modified in some way. In some embodiments, a user may move a tag by clicking and dragging the tag from a first location to a second, different location. Upon releasing the tag, the collaborative content management system 130 records the pixel location of the release point of the clicking and dragging action and calculates the relative position as previously described.

Each comment data element 520 is composed of a number of elements. In some embodiments, comment data element 520 includes the following elements:

CommentID: a unique identifier assigned by the collaborative content management system 130.

AuthorID: the userID of the author of the comment.

Content: an element storing the content of the comment, which may include text, pictures, or other media.

Attribute_list: a list storing the formatting attributes for the text of the comment, in the same manner as described above for collaborative content items.

ThreadID: the ThreadID of the thread to which the comment belongs.

State: an enumerated variable storing a value indicating the state of the comment as either active or resolved.

Notification_list: a list of userIDs indicating the users to whom a notification of the comment has been sent. This list is updated each time a notification message including the comment is sent to specific user.

Acknowledgement_list: the Acknowledgement_list element is a list of userIDs indicating the status of each user with respect to the comment. For example, the Acknowledgement_list may indicate whether each user in the Audience_list of the thread has yet viewed the comment, has read the comment, acknowledges an instruction in the comment, or intends to respond later to the comment, or any other set of enumerated actions or status types. This list is updated whenever the collaborative content item editor 404 displays the comment to a user that has not yet seen the new comment. In some embodiments, the collaborative content item editor 404 may display a visual indication of users that have viewed a particular comment proximate to the comment in the display. Additionally, the collaborative content management system 130 may provide UI elements for indicating status beyond applying a "read receipt" when a user views a comment for a first time.

Reaction_list: reactions are elements that represent reactions of each user in the audience of the thread to the comment. The reaction list comprises a list of reaction values paired with userIDs. In some embodiments, an interface for providing reactions to each comment is provided and a user may select a reaction using a pull-down feature or another such UI feature. An enumerated set of reactions is natively provided (e.g., "Approve," "Disapprove", "Happy", "Angry", "Puzzled" with associated numeric codes 1 . . . 5). Upon selection of a reaction from a reaction interface the numeric code corresponding to the selected reaction is added to the reaction list. For example, reaction pair (345, 5) would indicate that the user with userID 345 had an angry reaction to the comment. In some embodiments, the collaborative content item editor 404 displays a visual indication of each reaction proximate to the comment in the display.

CCI database 408 may also include a set of indices. These indices are logical in nature and may be implemented in various ways, depending on the underlying database design. A user index contains a list of all users by their userID, and for each userID there is a list of contentItemIDs. Each contentItemID identifies a collaborative content item to which the user of the userID is associated and has access to. For each contentItemID, there is a status indicator that indicates whether the collaborative content item is active or inactive for the user. A collaborative content item is active for the user sharing the collaborative content item until the user deletes the collaborative content item. In one embodiment, when the user deletes the collaborative content item, the collaborative content item persists in the collaborative content item database 408 and remains associated with the user but the status indicator is set to inactive, allowing the user to reactivate their sharing status with the collaborative content item in the future. The collaborative content item can remain active for, and associated with, any other users it was shared with. Alternatively, the collaborative content item may be deleted from the collaborative content item database 408, so that none of the shared users have access to it anymore. The user index is used to identify collaborative content items associated with (shared with) a given user and the status of those collaborative content items with respect to the user. In some embodiments, a userID index also indicates the privileges the user has with respect to each collaboration content item that the user is associated with. A value stored with each contentItemID in the index indicates whether the user has editing privileges, viewing privileges, and/or sharing privileges.

Collaborative content items database 408 can include a collaborative content item index. The collaborative content item index indicates, for each collaboration content item, a list of userIDs of users having access to the collaborative content item, and an indication of whether the user is active or inactive. This index can be an inverse of the user index and may be stored together with the user index. The collaborative content item index may also indicate the privileges of each user associated with the collaborative content item using an inverse implementation of the above described user index.

Comment Management User Interface

Figure 6C:
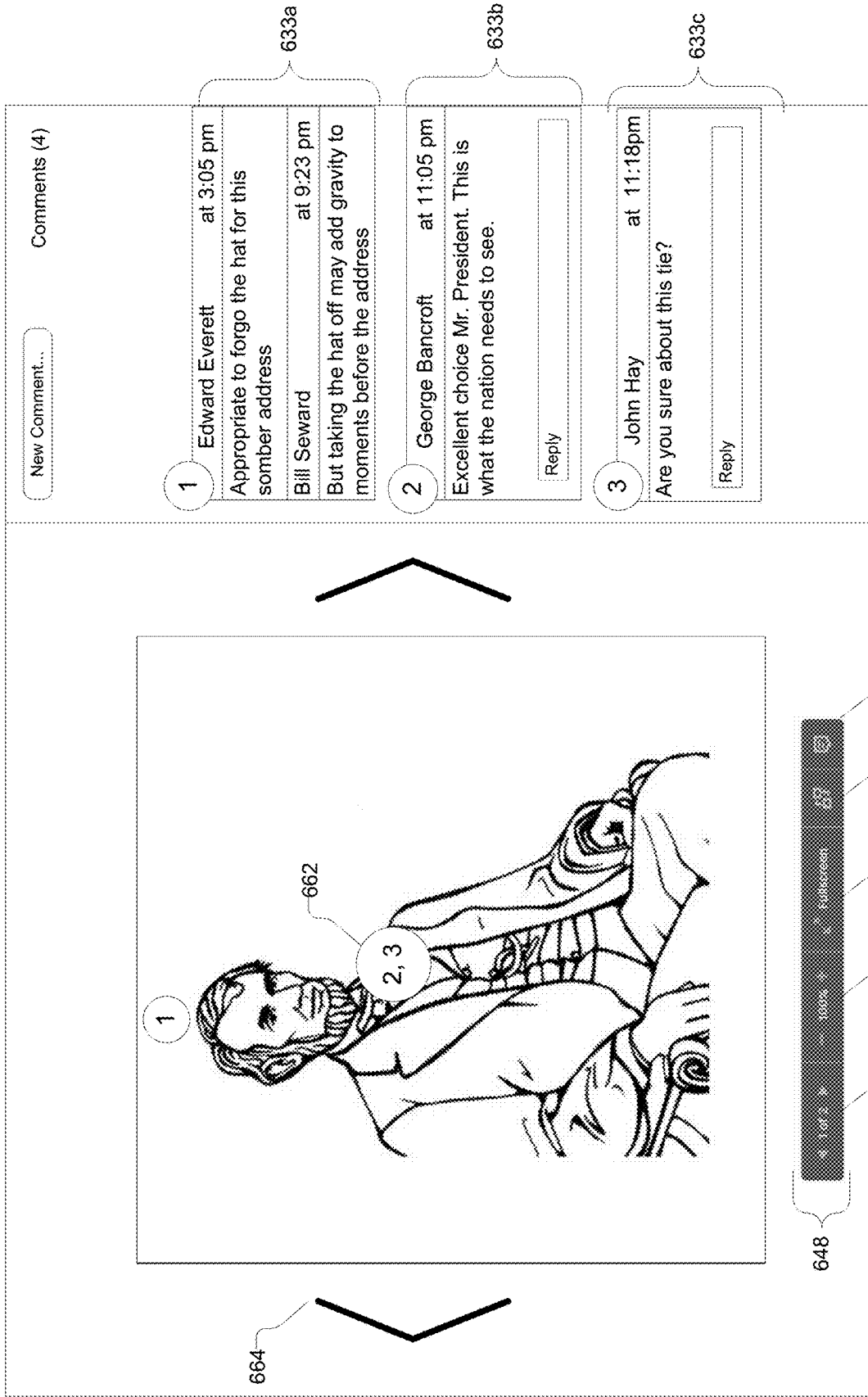

Referring now to FIG. 6A, there is shown an example user interface with a page of a collaborative content item 602 entitled "Draft Speech" in which several comments 604 have been made. In this example, a collaborative content item 602 is composed of content such as lines of text, which can be arranged such as in paragraph blocks 608, and may include any other form of media, such as images, videos, spreadsheets, executable or interpretable code, and so forth. The user interfaces shown in FIG. 6A-6E are generated by the collaborative content item editor 404 to allow the user to edit collaborative content items. The use may interact with the collaborative content item editor 404 using any of the provided user interface elements such as buttons, text, fields, and the like.

In some implementations, collaborative content item editor functionality can be triggered by recognizing primitives in content entered into a collaborative content item. A primitive can be a specified sequence of one or more characters that the collaborative content management system 130 recognizes as mapped to particular functionality. In some implementations, a primitive can be followed by one or more parameters specifying how the system should implement the corresponding functionality. In this implementation, the user would enter the specified sequence of one or more characters into the body of the collaborative content item 602 or, optionally, in the text of a comment 604 so that it could be detected by the collaborative content item editor 404. Examples of primitives include a user identification primitive (e.g. "@" followed by a username parameter—referred to herein as a method of a user), a task creation primitive (e.g. "[ ]" followed by a task title parameter), an emoji selector primitive (e.g., ":"), a content item selector and reference insertion primitive (e.g. "+" followed by a contentItemTitle parameter), a bullet list primitive (e.g. "*"), etc. Primitive parameters can define the corresponding functionality in various ways. For example, the +primitive can operate by taking the content specified by "contentItemTitle" and attempting to match it to an existing content item. In some implementations, when such a match is found, the primitive, and any associated parameter, can be replaced in the collaborative content item with a reference to the content item, such as a URL. Such a reference, when activated, can load the referenced collaborative content item into the collaborative content item editor interface. In some implementations, a primitive can take another primitive as a parameter. For example, the content "[ ]@kingHenry" can be interpreted such that @kingHenry links to a user with the username "kingHenry," and this link is used by the primitive "[ ]" to creates a new task, where that task is assigned to the kingHenry user.

Content Level Comments

A collaborative content item 602 can have zero or more content level comments 604. Content level comments can be associated with specific portions of a collaborative content item. The presence of content level comments 604 within the content item may be indicated by underlined (or colored underlined) portions 610 of content, though any other formatting may be used to indicate the presence of a content level comment 604 (e.g., lines connecting the content level comments to the content item, comment numbers in superscript form, highlighting, a "hover over" display indicator etc.). The portion 610 of content with which a content level comment is associated is also called a span. Content level comments 604 can be associated with overlapping spans; the first and second content level comments 604a, 604b are applied to the span "Now we are engaged in a great civil war, testing whether that nation, or any nation so conceived, and so dedicated, can long endure" and the third comment 604c is associated with just the span "This we may, in all propriety do."

The content level comments 604 are arranged in a comment pane 612 positioned to the side of the body of the collaborative content item 500. Each content level comment 604 has an author 614 (indicated by user name) and a creation date and time. A collection of comments that together form an exchange between users with respect to a single span is a thread 618. Threads are displayed proximate the span that is associated with the thread. In the example of FIG. 6A, there are three threads, 618a, 618b, and 618c; thread 618a has a total of four comments (two shown, and "2 more comments" as indicated) and the other threads have one comment each.

A user may create a new comment or reply to existing comment. To create a comment, a user selects a span in the content item, and activates a comment function, for example via button 622, menu or other input. The new comment 604 is displayed in the comment pane 612, indicating the user name and creation time, and the user may then enter text for the comment therein. The user can apply text formatting to the text of the comment as done for formatting the text of the collaborative content item. A user may also create a comment to include in a thread by entering text into a reply field 616 in one of the comments 604, such as an existing comment in a thread 618.

When a user opens a collaborative content item initially, the comment pane 612 can be closed such that the comments therein are hidden. The user can activate the comment pane 612 to show the content level comments by selecting text (e.g., double clicking) text that is formatted or otherwise indicated as having an associated comment. In some implementations, the comment pane 612 can be visible when a collaborative content item is opened. The pane 612 includes a counter 624 of the current number of comments in the collaborative content item that can be viewed by the current user. Each comment can have a state, as to whether the comment is active or resolved. The counter 624 serves as a menu that the user can select from to filter the comments so as to show all comments, active comments or resolved comments.

A collaborative content item may also include a share icon 626 that allows a user to share the collaborative content item with other users of the content management system 100. Upon clicking on the share icon 626 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

Image Comment Interfaces

FIGS. 6B-6E illustrate various interfaces for creating and displaying image comments.

FIG. 6B illustrates an image 628, in this case of Abraham Lincoln, accompanied by text 646 in a collaborative content item. The image 628 has been tagged with a first tag 630 and a second tag 638, having corresponding linked comment threads 633a and 633b respectively. Each comment (and corresponding tag) is associated with a specific portion or location in the image 628. The location can be defined as an offset from the image origin (e.g., the upper left corner of the image). Linked comment thread 633a includes comments 634 and 635, while linked comment thread 633b includes a single comment 640. The linked comment threads are identified using link identifiers 632 and 636, corresponding to linked comment threads 633a and 633b respectively, and further corresponding to identifiers in the tags 630 and 638, respectively.

FIG. 6B also shows an unlinked comment 642 in a content level thread 618d. The unlinked comment includes a tag button 644 and may be associated with the image as a whole.

In some embodiments, image tags 630 and 638 may not be displayed in their tagged locations unless a user interacts with an image, for example by clicking on the image, hovering over the image, or performing an operation on the image (e.g., resize, crop, etc.). In these embodiments the number of image tags may be displayed in a proximate location in relation to the image 628.

Additionally, in some embodiments linked comment threads 633a and 633b may not be displayed in full until the user interacts with the image 628. In these embodiments, the number of linked comment threads 633 may be displayed in the comment pane in a location proximate to the image 628.

FIG. 6C illustrates the result of a user interacting with the tag button 644 in FIG. 6B. Upon selection of the tag button 644, the collaborative content item editor 404 enters a mode in which the thread and comment can be linked to a specific portion of the image. In one embodiment, this mode is a lightbox mode such that the image associated with comment thread 618d may be displayed without surrounding content, such as content 646. In some embodiments, the image is displayed at a larger size when in lightbox mode. In alternative embodiments, the same functions as described with reference to FIGS. 6C-6E may be conducted outside of lightbox mode while other content is visible. In some embodiments, the image 628 is displayed at full resolution while in lightbox mode.

Entering lightbox mode causes the collaborative content item editor 404 to display an image option bar 648 that includes image navigator 650, zoom interface 652, full screen button 654, image replacement button 656, and new image comment button 658. Lightbox mode may also include image scrolling buttons 664.

When entering lightbox mode, image tags 630 and 638 are displayed in the same relative positions as they were in FIG. 6B. Upon interacting with the tag button 644, the user in this case selected a location for the tag on image 628, for example by clicking on a location in the image at which to link the comment to the image. The location of the click in the image (e.g., the (x,y) position of the mouse click relative to the image origin) are used to determine the location of the tag and the location at which the thread for the image comment will be linked. Example specific embodiments of determining the location for the tag and linking of the thread are further described below.

In this case the chosen location of the third tag was close to the existing location of the second tag. When two tags are placed close together at a particular zoom level, a tag cluster 662 icon can be created to maintain visual clarity. A tag cluster 662 indicates the individual tags that are located within a small area. The generation of a tag cluster is determined based on a distance between tags that is below a threshold. For example, a tag cluster may be created if there are fewer than 50 pixels between the positions of two tags. The distance between tags can be determined by using the relative position of the tags multiplied by the displayed resolution of the image, wherein the displayed resolution of the image is determined by the zoom level and the image size on the screen. In this case, cluster tag 662 represents tags two and three. A tag cluster 662 may be located at the average (x,y) location of the individual tags it represents, using the center of the tag cluster 662 for locating purposes. The average location can be computed as the centroid of the locations of the tags in the cluster. Alternatively, the threshold can be relative, based on the ratio of the pixel distance between the tags with respect the size of the image, e.g., a threshold of 5%. In some implementations, tag clusters can be generated for any group of tags that are within the threshold distance of one another, regardless of authorship. In some implementations, only tags by the same author that are within the threshold distance are converted into a cluster tag.

Image navigator 650 indicates the number of images in the collaborative content item. The navigator 650 enables the user to navigate directly through all of the images in the content item, and see any comments associated therewith. This enables the user to review those comments without having to scroll or page through the content item, and thus improves the efficiency for reviewing comments on images that are embedded in content item. This is particularly beneficial where the images are separated by many pages or large amounts of other types of content.

Zoom interface 652 indicates the zoom level of the image and allows the user to increase, decrease, or exactly specify the zoom level of the image. Full screen button 654 displays the image at full screen size upon receiving an interaction from the user. Image replacement button 656 allows the user to replace the current image with a new image. New comment button 658 allows the user to create a new linked comment thread 633 associated with the currently displayed image.

In some embodiments, the image replacement button 656 provides a dialog box or another image selection interface which allows selection of a second image (e.g. from a file system, the content management system, or another image source) to use to replace the currently displayed image. Upon the user selecting a replacement second image, the collaborative content item editor 404 displays an additional interface asking what should be done with the comments associated with the original image (e.g., archived, deleted, unlinked, or applied in their linked locations). In some implementations, instead of providing the additional interface, one of these actions can be performed by default.

If the user opts to archive or delete the linked comment threads associated with the displayed image, all comments associated with the image will be removed from the display. In some embodiments, the comments may be displayed again if the replacement image is replaced back to the original image. In some embodiments, the comments may be displayed again if the original image is added back to the collaborative content item at any location.

If the user opts to unlink the linked comments, the tags corresponding to each linked comment thread will be removed and the comment threads will instead be designated comments associated with the image as a whole (e.g., the span of the comment thread corresponds to the image with a null threadPos element).

If the user opts to apply the comments in their linked locations, the linked comment threads will be displayed with corresponding tags having the same relative locations in the new replacement image as they did in the original image.

This is done by using the coordinates that define the location of the tag in the image and mapping them to corresponding coordinates in the replacement image. This approach preserves the comments so that user can determine if the comment was addressed (e.g., a request for a change in image content) by the replacement image.

In addition to providing the above options for handling comments during image replacement, in various embodiments, the collaborative content item editor 404 may provide a version history feature for preserving iterations of an image and any comments associated with each of the iterations of the image. In these embodiments, the collaborative content item editor 404 may provide a version history button, in the image option bar 648 or elsewhere in the user interface, for reviewing the version history of an image. Upon selection of the button, the collaborative content item editor 404 may display previous versions of the image in the user interface and/or navigation buttons that allow the user to scroll through previous versions of the image, depending on the embodiment. Archived comments associated with each version of the image may be displayed in association with each previous version displayed by the collaborative content item editor 404, along with any accompanying image tags.

The collaborative content item editor 404 may selectively unlink comments in response to a change in size of the image or in response to a replacement of the image with a cropped version of the same image. In some embodiments, the collaborative content item editor 404 detects a change in size of the image and compares the change in size to a predetermined resize threshold. If the change in size exceeds the resize threshold, tagged comments associated with the image are unlinked and displayed as typical content level comments associated with the image as a whole. For example, if the collaborative content item editor 404 detects that the user has reduced the size of an image by 40% and the resize threshold is 35%, the collaborative content item editor 404 may unlink comments tagged in the original version of the image.

Alternatively, the collaborative content item editor 404 may detect that a replacement image is a cropped version of the original image and may automatically unlink or delete comments that are no longer within the bounds of the image. The collaborative content item editor 404 may perform a computational image analysis to identify the regions of the image that have been removed in the crop in relative coordinates. The collaborative content item editor 404 may then unlink or delete any comments that have tags in the identified region of the image by comparing the relative coordinates of the tagged comments to the identified region. For example, if a user removes the leftmost 25% of an image, the collaborative content item editor 404 identifies the removed region as ([0,0.25],[0,1]). If any of the comments associated with the image has a tag within that region, those comments may be automatically unlinked or deleted, and the image displayed without the tag.

Figure 6D:
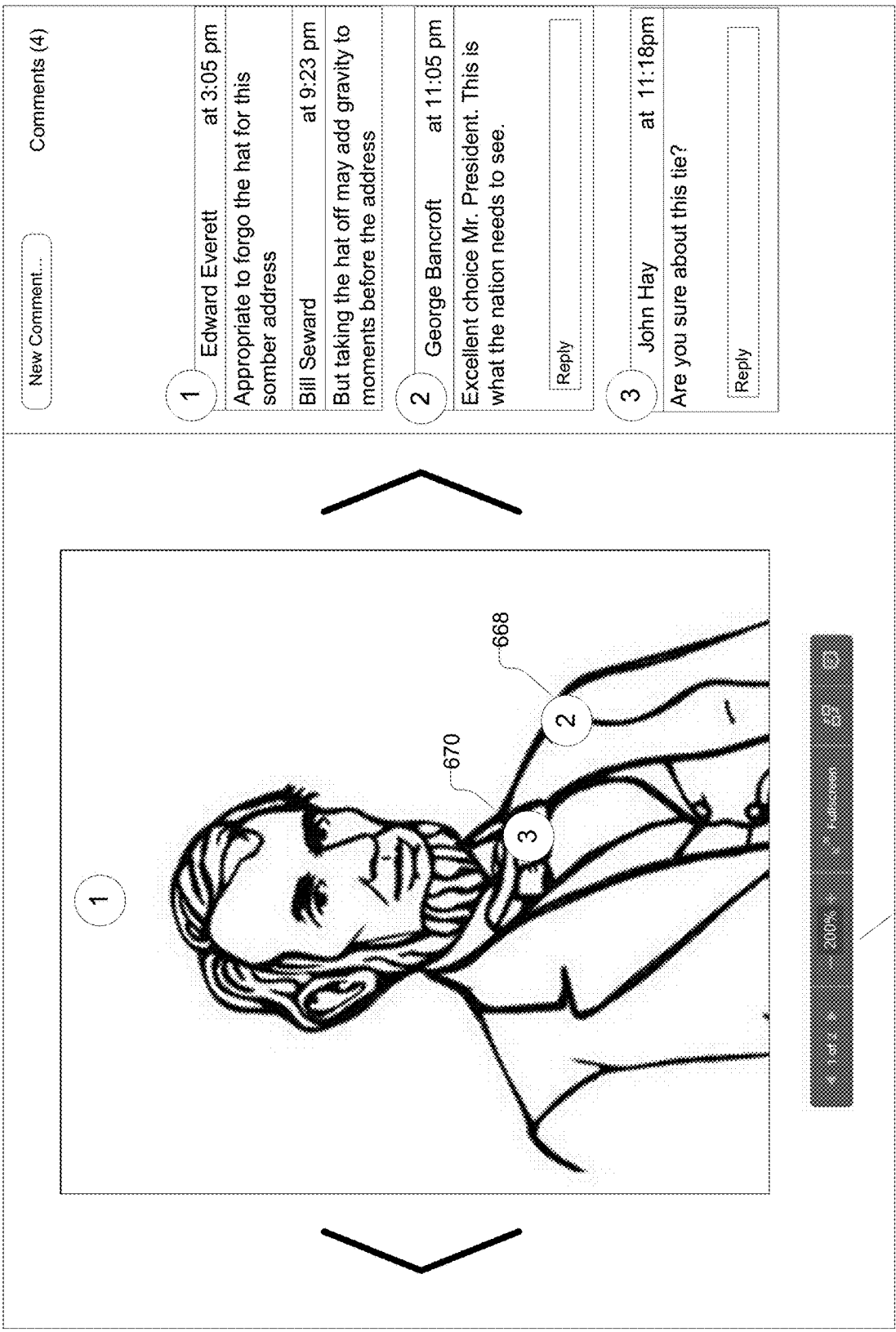

FIG. 6D illustrates the result of an increase in the zoom level of the image through the zoom interface 652. When the zoom level is increased the distance between tags two and three has increased past the clustering threshold. In response, the tag cluster 662 is broken into separate tags 668 and 670, located in their relative locations. Because the location of each tag is stored the threadPos associated with each tagged thread, the threadPos positions may be used to determine the original relative locations of the tags before they were clustered together using the average of those positions.

Upon detecting a command from the user to increase the zoom of an image such that some image tags are outside of the zoomed area of the image, the collaborative content item editor 404 may not display some tags that fall outside of the zoomed area of the image, may indicate on the comments associated with the those tags that the tags are not currently being displayed, or may convert tags outside the zoomed area to comments on the image as a whole. The zoomed area of the image is determined based on the zoom level the user has indicated using the zoom interface 652 along with a position in the image provided by the user through scrolling inputs, cursor movement, or the like.

Figure 6E:
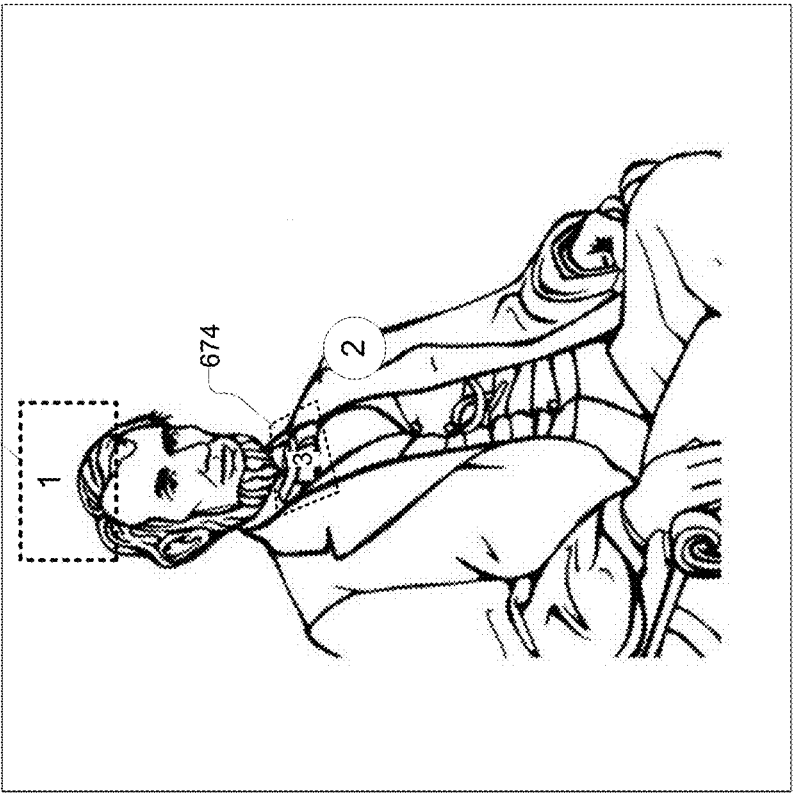

FIG. 6E illustrates an embodiment where linked comments can be linked to areas of the image. An area is defined by a bounding area. In one embodiment, a rectangular bounding area can be created by the user by clicking and dragging from the desired location of a first corner to an opposite corner (e.g., from an upper left corner to a lower right corner). Tag 672 is an example. Alternatively, the bounding area can be created by a series of point selections to define a sequence of vertices of a polygon. Tag 674 is an example. Both of these tags 672 and 674 are enabled such that either may be linked to a respective linked comment thread, e.g., 633a or 633c. In various embodiments, after selection of tag button 644, double-clicking at a location on the image creates a location tag, clicking and dragging creates a rectilinear bounding box, clicking in sequence creates a polygonal bounding box, or drawing an enclosed area creates a non-uniform bounding area. In some implementations, a drawn bounding area is saved as a series of relational points a short distance apart.

Creating Image Comment Threads

FIG. 7A shows an embodiment of a client side algorithm for creating a comment thread for an image related comment. The collaborative content item editor 404 receives 700 an indication of a selected image in a collaborative content item. The collaborative content item editor 404 receives 702 a command to create a comment associated with the selection of the image. In some implementations, the indication of the selected image and the command to create a comment can be received together.

The collaborative content item editor 404 receives 704 content to include in the comment. The received content can be obtained at a client device that displays (e.g., via collaboration content item editor 404) an interface for receiving a content input (including any text, text formatting, images, or the like) by the user. In some implementations, the client device can receive the selection of the image, the command to create a comment, and the comment content. Once all of these have been received by the client device, the client device can provide, to collaboration content management system 130, an indication of the selected content and the content to include in the comment when providing the command to create the content. For example, by receiving a selection of a new image comment button, the collaborative content item editor 404 may provide an interface for entering comment content to the client device. In various implementations, the collaboration content editor may receive the selection of the image for the comment, the command to create a new comment, and the content of the comment together or separately.

The collaborative content item editor 404 receives 706 a command to create an image tag to associate the thread with a specific portion of the image, e.g., selection of the tag button. The collaborative content item editor 404 enters the lightbox mode or another mode in which a portion of the image can be selected for linking with the thread. The collaborative content item editor 404 receives 708 a selection of an image portion, either a location or a bounding area, to be linked with the thread.

In some embodiments, the collaborative content item editor 404 determines the information defining the coordinates of the location, which can be in terms of relative coordinates based on the image resolution, as described above. The coordinates for the selected portion are later stored in association with the thread, for example in the threadPOS field of the thread data structure. In other embodiments, coordinate determination is completed by the collaborative content management system 130 (see discussion of FIG. 7B below).

In some implementations, step 708 occurs before steps 702, 705, and 706. In some implementations, the user may select an area of the image (step 708) without first selecting the image as a whole (step 700). This could be completed by receiving a user selection of "new image comment" button 658. The collaborative content item editor 404 may then enter a mode for selecting an associated location or bounding area of the image. Upon receiving a selection of a portion of the image, the collaborative content item editor 404 may provide an interface for receiving comment content. Once the collaborative content item editor 404 receives comment content, the collaborative content item editor 404 sends a command to the collaborative content item management system 130 to create an image comment in CCI database 408.

The collaborative content item editor 404 then displays 712 a tag icon at the specified portion of the image, including assigning an identifier linking the tag to a thread. In some implementations, the collaborative content item editor 404 evaluates whether image tags should be clustered when the image is displayed at a particular resolution, as discussed above. In other embodiments, the collaborative content management system 130 may determine when tags are clustered and a clustered tag may be received by the collaborative content item editor 404 for display.

The collaborative content management system 130 works on the server side to record the results of image comment creation in CCI database 408. The collaborative content management system 130 obtains 750, from the collaborative content item editor 404, a selection of the image (which may include an image identifier or URL), comment content, and an indication of a portion of the image. The collaborative content management system 130 creates 752 a comment in the CCI database 408 and assigns a commentID, and the userID of the user to the authorID of the comment. The collaborative content management system 130 creates 754 a thread object in the CCI database 408, assigning a new threadID, adding the commentID for the comment to the commentID list for the thread, and saving the comment content to the database. The image selection is utilized to set the span of the thread, while the indicated portion of the image is saved as the threadPos of the thread. In some embodiments, the collaborative content management system 130 computes 756 the relative coordinates of the comment tag based on the obtained portion of the image.

Figure 8A:
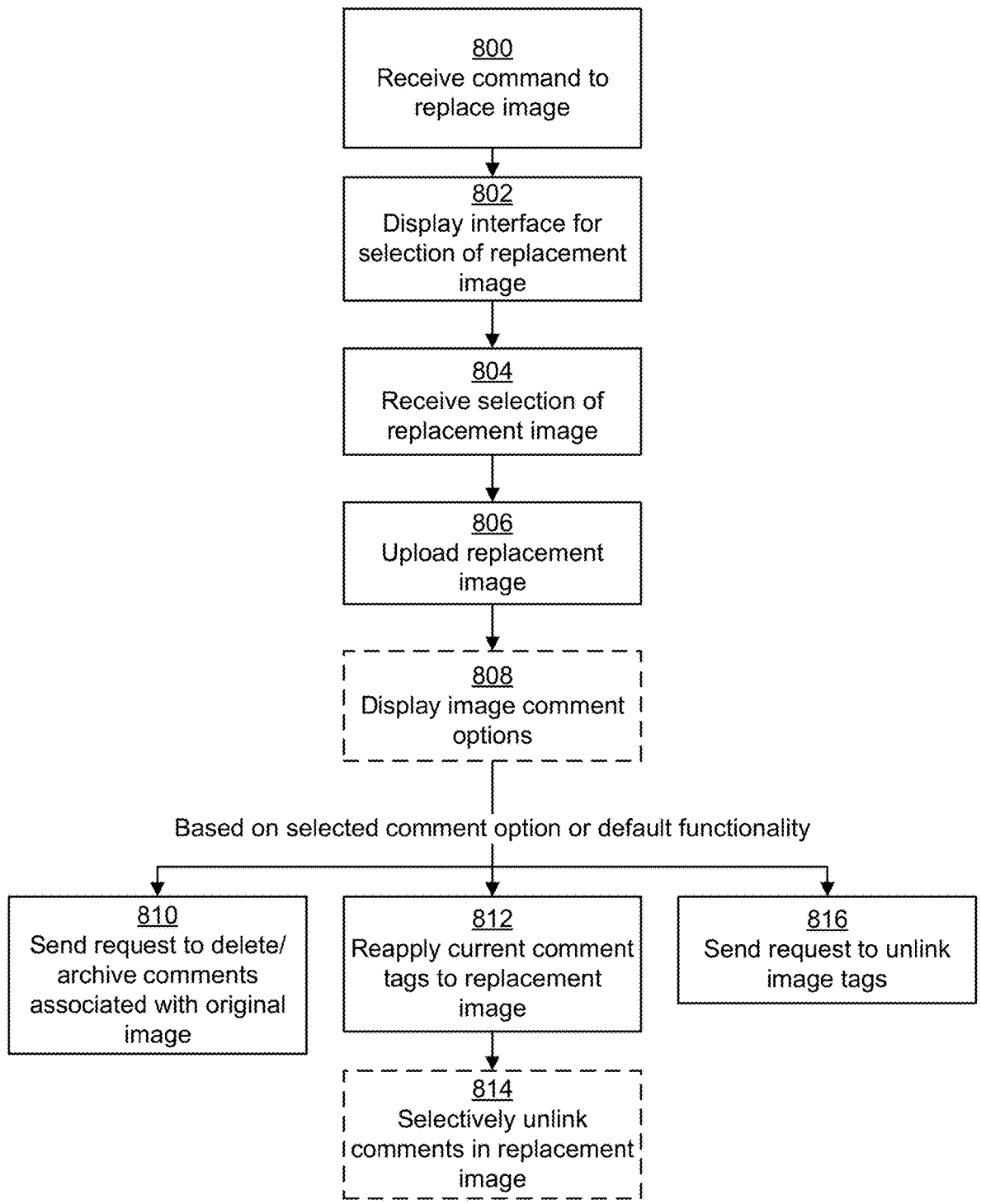
FIG. 8A shows one embodiment of a client side algorithm for replacing an image and handling associated image comments.

FIG. 8A shows one embodiment of a client side algorithm for replacing an image and handling associated image comments. Initially, the collaborative content item editor 404 receives 800, a command to replace an image in a collaborative content item. For example, a user may interact with the new image comment button 658. In response to receiving the command to replace an image, the collaborative content item editor 404 displays 802 an interface for selection of a replacement image. For example, the interface may be a file navigation window, allowing the user to select an image from their local file system or from synchronized content items on the content management system 100. Alternatively, the interface may be a drag and drop zone that allows the user to drag and drop a chosen image file into the zone. Once the replacement image selection interface has been displayed 802, the collaborative content item editor 404 receives 804 a selection of a replacement image from the user.

In some implementations, steps 800-804 may be accomplished together. For example, the user may drag and drop a replacement image into the same location as the original image in the collaborative content item or may select the original image and paste the replacement image while the original image is selected. In these cases, the command to replace the original image coincides with the selection of the replacement image.

Upon receiving 804 the selection of the replacement image, the collaborative content item editor 404 uploads 806 the replacement image to the collaborative content management system 130. In some implementations, collaborative content item editor 404 may instead provide an indication of the replacement image, such as an imageID. The replacement image may only be uploaded to the collaborative content management system 130 if collaborative content management system 130 does not already have access to the replacement image. For example, if the user selected the replacement image from images stored in content management system 100, the collaborative content management system 130 may already have access to that image in content management system 100.

The collaborative content item editor 404 may, optionally (indicated by the dotted lines in FIGS. 8A and 8B), display 808 image comment options to the user. The image comment options may include, deleting or archiving comments associated with the original image, reapplying the current image comment tags to the replacement image, or unlinking the comments in the original image from their tagged locations or portions of the image and associating the comments with the image as a whole. Alternatively, the collaborative content item editor 404 may select one option by default or through image analysis of the original and replacement images. For example, the default option of the collaborative content item editor 404 may reapply the current image comments and associated tags to the new image. If the image comment options are selected based on image analysis, the collaborative content item editor 404 may perform or request from the collaborative content management system 130 an image analysis of the two images. If the collaborative content management system 130 determines from the analysis that the images are substantially similar, the image comments may be applied to the new image. Alternatively, if the collaborative content management system determines from the analysis that the images are substantially different, the image comments may be archived, deleted, or unlinked from their corresponding positions in the image. The image analysis can include measuring similarity between various characteristics of the two images such as color similarity, size similarity, object identification matching, etc. Substantial similarity or difference can be determined based on comparing the measured similarities to thresholds.

The selection (by the user, by default, or by image analysis) of the image comment option can be to delete or archive the image comments associated with the original image. In response, the collaborative content item editor 404 can send 810 a request to the collaborative content management system 130 to delete or archive the comments associated with the original image.

If the selection is the option to reapply the current image comment tags to the replacement image, the collaborative content item editor 404 can reapply 812 the tags in their relative locations. The collaborative content item editor 404 can use the threadPos element of each comment thread with a span that includes the replacement image to determine the pixel location of the tag as described above. The tags are then displayed in the determined positions in the replacement image. Optionally, if the collaborative content management system 130 determines that the replacement image is a cropped version of the original image, some of the tags may be unlinked 814 from the associated image portion, while remaining associated with the image as a whole. In this case, the collaborative content management system 130 can perform the image analysis comparing the replacement image and the original image and change the threadPos of the comments accordingly. Alternatively, the image analysis could be completed by the collaborative content item editor 404.

Finally, the selection can be the option to unlink comments from their corresponding tags in the image. In response, the collaborative content item editor 404 can send 816 a request to the collaborative content management system 130 to unlink all comments associated with the original image (by replacing threadPos of each comment thread with a null value). Because the comments threads have a span including the image they remain associated with the image as a whole and are displayed accordingly by the collaborative content item editor 404.

Figure 8B:
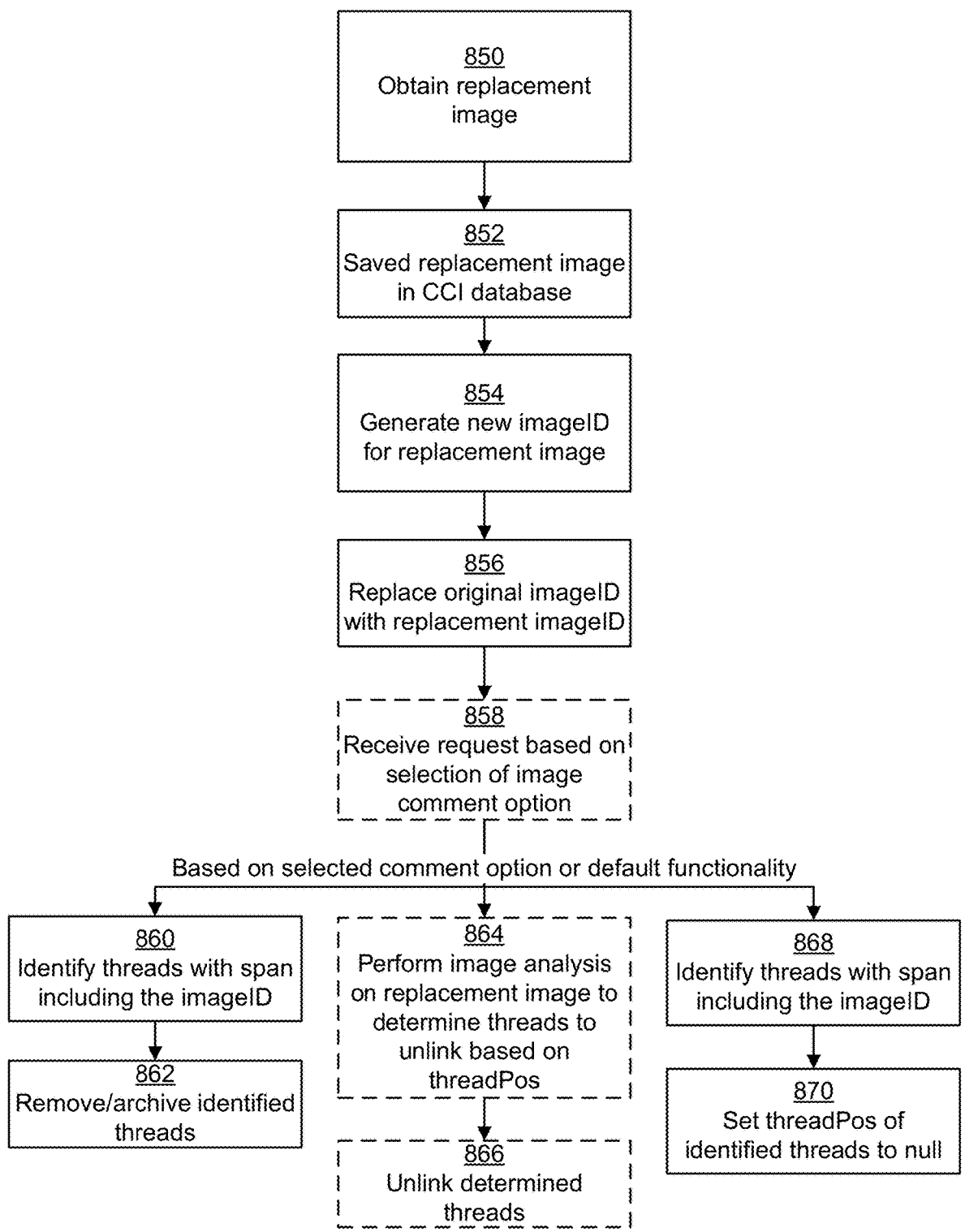
FIG. 8B shows one embodiment of a server side algorithm for replacing an image and handling associated image comments.

FIG. 8B shows one embodiment of a server side algorithm for replacing an image and handling associated image comments. First the collaborative content management system 130 can obtain 850 a replacement image. The replacement image can be obtained from the collaborative content item editor 404 or another source, such as the content management system 100. The collaborative content management system 130 can then save 852 the replacement image or a reference to the replacement image in the CCI database 408 and generate 854 a new imageID for the replacement image. Once an imageID is generated for the replacement image, the collaborative content management system 130 can replace 856 the original imageID in the text of the collaborative content item with the imageID of the replacement image at the same location. Thus, any comment threads having a span including the imageID of the original image now have a span including the replacement image and will likewise be associated with the replacement image. In some implementations, a log of the original imageID can be kept, enabling an image history for a location, which a user can access to return to a previous image for that location.

After replacing the original imageID with the replacement imageID, the collaborative content management system 130 may optionally receive 858 a request from the collaborative content item editor 404 indicating an image comment option selected by the user. Alternatively, the collaborative content management system 130 may use a default image comment option or determine an option based on image analysis of the original image and the replacement image.

If the selected image comment option is to delete or archive the image comments associated with the original image, the collaborative content management system 130 can identify 860 threads with a span including the replacement imageID. The collaborative content management system 130 can then remove or archives 862 the identified threads from the CCI database 408. If the threads are to be deleted, then the collaborative content management system 130 simply deletes them from the CCI database. If the threads are to be archived, the collaborative content item may set an archived property for the thread indicating that the threads should not be included in the usual comment area. Alternatively, a thread to be archived can be saved in a second database or a different partition of the CCI database and associated with the original imageID using a database table.

If the selected image comment option is to apply the tags on the original image to the new image, then the collaborative content management system 130 may perform 864 an image analysis comparing the original image and the replacement image. If the collaborative content management system 130 determines through image analysis that the replacement image is a cropped version of the original image, the collaborative content management system 130 may unlink 866 comment threads with threadPos outside of the cropped section of the image. In order to accomplish this, the collaborative content management system 130 can determine the regions of the original image that have been removed in terms of the original relative coordinates. If the threadPos of a thread falls within the removed region, expressed in relative coordinates, the threadPos of the thread can be changed to null while the span can still include the imageID of the replacement image. Thus, the thread remains associated with the image as a whole but does not have an associated tag.

Additionally, the collaborative content management system 130 may adjust the relative positions associated with the remaining threads instead of unlinking them. This may be accomplished by scaling each coordinate defining the position of a tag based on the amount of the image that has been removed in the replacement image in each dimension. The positions or portion of the image associated with the threads may be recalculated by recalculating the relative position in each dimension given the new relative dimensions of the image. For example, if a tag is located at a relative position of (0.2, 0.3) and the new relative dimensions of the image after the crop are (0.1-0.9, 0-0.5) the new relative positions are determined by the formula (0.2−0.1)/(0.9−0.1) and (0.3−0)/(0.5−0) for the x and y dimensions respectively. This yields the new relative coordinate (0.125, 0.6) in the replacement image.

If the selected image comment option is to convert an image tag into a comment on the image as a whole, the collaborative content management system 130 can identify 868 all threads with a span including the replacement imageID and set 870 the threadPos of those threads to null.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. Moreover, claim language reciting 'at least one of' an element or another element refers to any possible permutation of the set of elements. For example, claim language reciting 'at least one of A and B' or 'at least one of A or B' means A, B, or both A and B."

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Any patents, patent applications, and other references noted above are incorporated herein by reference. Aspects can be modified, if necessary, to employ the systems, functions, and concepts of the various references described above to provide yet further implementations. If statements or subject matter in a collaborative content item incorporated by reference conflicts with statements or subject matter of this application, then this application shall control.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method, comprising:
receiving, from a client device, a comment associated with a location within an image;
determining relative coordinates for the location within the image by determining a horizontal relative dimension comprising a percentage or a ratio of a width of the image and a vertical relative dimension comprising a percentage or a ratio of a height of the image;

causing the client device to display the collaborative content item within a content item interface wherein the image and image comment are displayed within the content item interface;

causing the client device to display a tag at the location within the image based on the relative coordinates for the location within the image, the tag identifying the image comment;

modifying the collaborative content item to replace the image with a different image, wherein the different image is a resized replica of the image;

causing the client device to update the display of the collaborative content item within the content item interface wherein the different image is displayed while maintaining the display of the image comment; and causing the client device to update the display of the tag based on the relative coordinates for the location within the image and based on a first relationship between the height of the image and a height of the different image and based on a second relationship between the width of the image and a width of the different image.

2. The method of claim 1, wherein causing the client device to update the display of the tag comprises:

multiplying the horizontal relative dimension comprising the percentage or the ratio of the width of the image by the width of the different image to determine a horizontal pixel location, multiplying the vertical relative dimension comprising the percentage or the ratio of the height of the image by the height of the different image to determine a vertical pixel location, and causing the client device to display the tag within the different image at the horizontal pixel location and the vertical pixel location.

3. The method of claim 1, wherein the location associated with the comment is received via a selection of a single location within the image by a user of the client device.

4. The method of claim 1, wherein the location associated with the comment is received via a selection of a bounding area within the image by a user of the client device.

5. The method of claim 1, wherein causing the client device to display the tag at the location within the image comprises:

determining whether the relative coordinates are within a threshold distance of a portion of the image associated with a previously created image comment;

responsive to the relative coordinates being within the threshold distance, creating a tag cluster indicating both the tag and a previously created tag associated with the previously created image comment; and displaying the tag cluster at a location within the image based on the relative coordinates of the image comment and relative coordinates of the previously created image comment.

6. The method of claim 1, wherein causing the client device to update the display of the tag comprises:

determining an amount by which the different image is cropped from the image;

adjusting the relative coordinates of the image comment based on the determined amount; and displaying the tag at a location within the different image based on the adjusted relative coordinates.

7. A non-transitory computer-readable storage medium storing executable instructions that, when executed by one or more processors, cause the one or more processors to perform steps comprising:

receiving, from a client device, a comment associated with a location within an image;

determining relative coordinates for the location within the image by determining a horizontal relative dimension comprising a percentage or a ratio of a width of the image and a vertical relative dimension comprising a percentage or a ratio of a height of the image;

causing the client device to display the collaborative content item within a content item interface, wherein the image and image comment are displayed within the content item interface;

causing the client device to display a tag at the location within the image based on the relative coordinates for the location within the image, the tag identifying the image comment;

modifying the collaborative content item to replace the image with a different image, wherein the different image is a resized replica of the image;

causing the client device to update the display of the collaborative content item within the content item interface, wherein the different image is displayed while maintaining the display of the image comment; and causing the client device to update the display of the tag based on the relative coordinates for the location within the image and based on a first relationship between the height of the image and a height of the different image and based on a second relationship between the width of the image and a width of the different image.

8. The non-transitory computer-readable storage medium of claim 7, wherein causing the client device to update the display of the tag comprises:

multiplying the horizontal relative dimension comprising the percentage or the ratio of the width of the image by the width of the different image to determine a horizontal pixel location, multiplying the vertical relative dimension comprising the percentage or the ratio of the height of the image by the height of the different image to determine a vertical pixel location, and causing the client device to display the tag within the different image at the horizontal pixel location and the vertical pixel location.

9. The non-transitory computer-readable storage medium of claim 7, wherein the location associated with the comment is received via a selection of a single location within the image by a user of the client device.

10. The non-transitory computer-readable storage medium of claim 7, wherein the location associated with the comment is received via a selection of a bounding area within the image by a user of the client device.

11. The non-transitory computer-readable storage medium of claim 8, wherein causing the client device to display the tag at the location within the image comprises:

determining whether the relative coordinates are within a threshold distance of a portion of the image associated with a previously created image comment;

responsive to the relative coordinates being within the threshold distance, creating a tag cluster indicating both the tag and a previously created tag associated with the previously created image comment; and displaying the tag cluster at a location within the image based on the relative coordinates of the image comment and relative coordinates of the previously created image comment.

12. The non-transitory computer-readable storage medium of claim 7, wherein causing the client device to update the display of the tag comprises:
- determining an amount by which the different image is cropped from the image;
- adjusting the relative coordinates of the image comment based on the determined amount; and
- displaying the tag at a location within the different image based on the adjusted relative coordinates.

13. A system, comprising:
one or more processors; and
a non-transitory computer-readable storage medium storing executable computer instructions that, when executed by the one or more processors, cause the one or more processors to perform steps comprising:
- receiving, from a client device, a comment associated with a location within an image;
- determining relative coordinates for the location within the image by determining a horizontal relative dimension comprising a percentage or a ratio of a width of the image and a vertical relative dimension comprising a percentage or a ratio of a height of the image;
- causing the client device to display the collaborative content item within a content item interface, wherein the image and image comment are displayed within the content item interface;
- causing the client device to display a tag at the location within the image based on the relative coordinates for the location within the image, the tag identifying the image comment;
- modifying the collaborative content item to replace the image with a different image, wherein the different image is a resized replica of the image;
- causing the client device to update the display of the collaborative content item within the content item interface, wherein the different image is displayed while maintaining the display of the image comment; and
- causing the client device to update the display of the tag based on the relative coordinates for the location within the image and based on a first relationship between the height of the image and a height of the different image and based on a second relationship between the width of the image and a width of the different image.

14. The system of claim 13, wherein causing the client device to update the display of the tag comprises:
- multiplying the horizontal relative dimension comprising the percentage of the width of the image by the width of the different image to determine a horizontal pixel location,
- multiplying the vertical relative dimension comprising the percentage of the height of the image by the height of the different image to determine a vertical pixel location, and
- causing the client device to display the tag within the different image at the horizontal pixel location and the vertical pixel location.

15. The system of claim 13, wherein receiving the comment comprises:
- receiving, from the client device, a selection of a user interface comment element displayed in conjunction with the image to create the comment.

16. The system of claim 13, wherein the location associated with the comment is received via a selection of a bounding area within the image by a user of the client device.

17. The system of claim 13, wherein causing the client device to display the tag at the location within the image comprises:
- determining whether the relative coordinates are within a threshold distance of a portion of the image associated with a previously created image comment;
- responsive to the relative coordinates being within the threshold distance, creating a tag cluster indicating both the tag and a previously created tag associated with the previously created image comment; and
- displaying the tag cluster at a location within the image based on the relative coordinates of the image comment and relative coordinates of the previously created image comment.

* * * * *